United States Patent [19]
Nightingale

[11] Patent Number: 5,588,905
[45] Date of Patent: Dec. 31, 1996

[54] TOPICAL PATCH TO REDUCE FECAL CONTAMINATION DURING SLAUGHTER

[75] Inventor: William T. Nightingale, Alta Loma, Calif.

[73] Assignee: Pacer Technology, Rancho Cucamonga, Calif.

[21] Appl. No.: 567,266

[22] Filed: Dec. 5, 1995

[51] Int. Cl.$^6$ .................................................. A22C 21/00
[52] U.S. Cl. ............................................................. 452/176
[58] Field of Search ................................................ 452/176

[56] References Cited

U.S. PATENT DOCUMENTS

| | | |
|---|---|---|
| 4,057,535 | 11/1977 | Lipastova et al. . |
| 4,473,419 | 9/1984 | Hardy ........................................ 156/94 |
| 4,899,421 | 2/1990 | Van Der Eerden . |
| 5,083,975 | 1/1992 | Neal et al. . |
| 5,114,380 | 5/1992 | Larsen . |
| 5,120,266 | 6/1992 | Aubert ..................................... 452/176 |
| 5,120,267 | 6/1992 | Neal et al. . |
| 5,292,278 | 3/1994 | Neal et al. ............................... 452/176 |
| 5,494,481 | 2/1996 | Anderberg ............................... 452/176 |

*Primary Examiner*—Willis Little
*Attorney, Agent, or Firm*—Law Offices of Thomas E. Schatzel a Prof. Corporation

[57] ABSTRACT

An adhesive patch includes an appliqué of material with one side covered in cryanoacrylic ester tissue glue with dimensions sufficiently large to cover the natural pelvic vents of beef and pork carcasses. The material appliqués are dispensed with glue applied at the moment of use on an animal slaughter processing line.

9 Claims, 1 Drawing Sheet

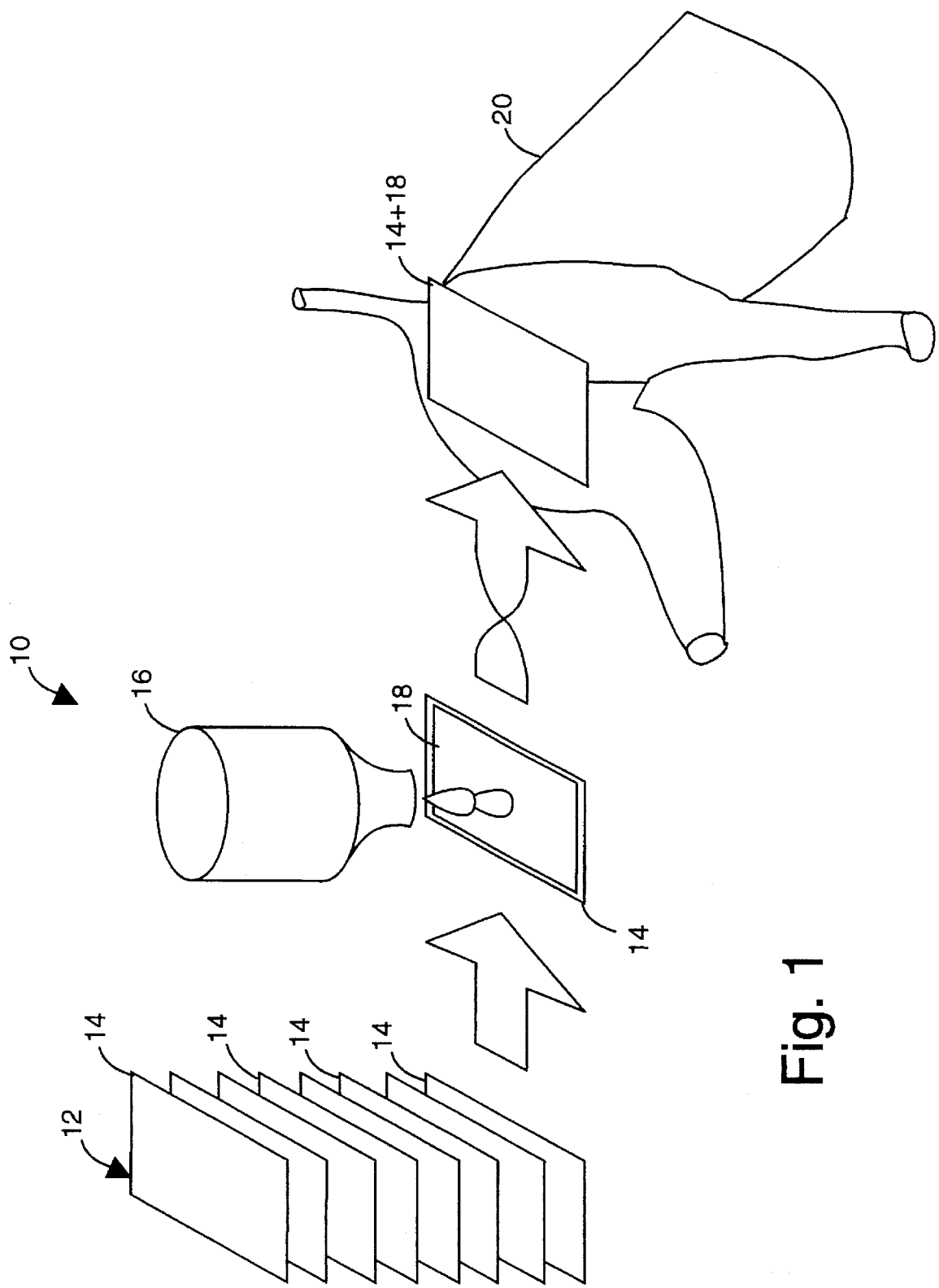

TOPICAL PATCH TO REDUCE FECAL CONTAMINATION DURING SLAUGHTER

BACKGROUND OF THE INVENTION

1. Field of the Invention

The invention relates generally to methods and devices for animal slaughter contamination control, specifically to patches for sealing the vents of food animal carcasses, whereby preventing spilling of urine and fecal matter contained in the intestinal tract onto or into the carcass.

2. Description of the Prior Art

The urine and fecal matter contained in the intestines and uterus of beef and pork carcasses can seriously contaminate the otherwise bacteria-free meat if they are not kept separate and contained. Various types of bacteria are found in the intestines of butchered animals and such bacteria is often toxic to consumers of the meat and also can prematurely spoil the meat. Such bacteria in cattle includes E. coli 0157:H7, and other deadly strains that can withstand some traditional food-processing techniques. So government regulations strictly control the acceptable levels of bacteria in the finished meat products. Some have proposed irradiation of meat as a way to control such contamination. But others concerned with the hazards of the irradiation process itself to workers have taken the position that the problems should be controlled at the source, e.g., using better butchering methods.

The natural vents of the animals, e.g., the anus and vagina, are the only natural outlets for the intestines and uterus of beef and pork carcasses during slaughter, so care must be taken not to nick or cut the organs after the vents are sealed. If the organs and vents can be cut out of the carcass as a single unit without spilling any of the liquid contaminants on the remaining meat, the control of bacterial infection in the meat is greatly simplified.

Fecal contamination is particularly problematic with poultry animals as the animals are submerged in mass in tanks of hot water during processing to help loosen feathers. The carcasses are tanked a second time in cold water to chill the carcasses. USDA regulations require carcasses which have fecal matter on them, as evidenced by staining or discoloration, to be quarantined and reworked prior to being allowed back into production. The chances of severe bacterial contamination are increased by making the two trips through the water baths. Individual animals which have fecal matter on the carcass or fecal matter that leaks from the animals contaminates the whole of the tank water. This form of contamination is difficult and expensive to detect, as it requires biological testing which often takes hours to obtain final results. Large numbers of carcasses can be contaminated by only a few leaking ones that create a "fecal soup".

Poultry vents are relatively simple to seal, since the vents are much smaller than those in beef and pork carcasses. U.S. Pat. Nos. 5,083,975, issued Jan. 28, 1992, 5,120,267, issued Jan. 9, 1992, and 5,292,278, issued Mar. 8, 1994, all to Neal, et al., describe adhesives and methods for gluing the vent tissues of poultry and fowl carcasses to prevent fecal leakage during processing. Such disclosures are incorporated herein by reference.

U.S. Pat. No. 5,114,380, issued May 19, 1992, describes the use of an anal plug in a method for eviscerating animal carcasses. But such describes freezing of the anus to an inserted plug, and as such is complicated and is still nevertheless not immune from leakage of contaminants.

Increasing government scrutiny and testing of meat products at the retail level now demands that better slaughtering methods be employed to reduce the traditionally high levels of meat contamination.

SUMMARY OF THE PRESENT INVENTION

It is therefore an object of the present invention to provide a vent patch to be adhered to food animal carcasses to prevent contamination resulting from leakage of urine or fecal matter from the natural pelvic vents during processing.

It is another object of the present invention to provide a vent patch to be adhered to beef or pork carcasses during slaughter that uses materials that are compatible with renderings of all food.

Briefly, an adhesive patch embodiment of the present invention includes an appliqué of latex, vinyl or natural fiber with one side covered in cryanoacrylic ester adhesive with dimensions sufficiently large to cover the natural pelvic vents of beef, pork and other food animal carcasses. The material appliqués are dispensed with glue applied at the moment of use on an animal slaughter processing line.

An advantage of the present invention is that an adhesive patch is provided that reduces or prevents fecal mater contamination of meat in slaughtering processes.

These and other objects and advantages of the present invention will no doubt become obvious to those of ordinary skill in the art after having read the following detailed description of the preferred embodiments which are illustrated in the various drawing figures.

IN THE DRAWINGS

FIG. 1 is a diagram of a carcass vent sealing system of the present invention in use in a slaughtering process line.

DETAILED DESCRIPTION OF THE PREFERRED EMBODIMENTS

FIG. 1 shows a carcass vent sealing system of the present invention, referred to herein by the general reference numeral 10. The system 10 includes a dispensing stack 12 comprising a number of individual material appliqués 14. A process operator draws each appliqué 14 out of the dispensing stack 12 one-at-a-time and uses a glue reservoir 16 to spread a tissue adhesive 18 on one side of the appliqué 14. The combination of the appliqué 14 and tissue adhesive 18 is rotated to be applied adhesive-side down on a carcass 20 over the natural pelvic vents. Preferably, the tissues of the carcass 20 are cleaned, dried and dehaired around the natural pelvic vents to promote good adhesion and sealing of the appliqué 14 with the tissue adhesive 18.

The tissue adhesive 18 must be strong, quick curing and non-toxic after curing. For example, cyanoacrylate adhesives cure in seconds and form strong bonds to skin tissues. The disclosures of Neal, et al., above, describe such adhesives. Also, U.S. Pat. No. 4,057,535, issued Nov. 8, 1977, describes aromatic diisocyanate adhesives for gluing together soft body tissues, in lieu of suturing. Such disclosure is incorporated herein by reference.

The material of the appliqué 14 must be impervious to liquid penetration and should be edible in small amounts as both the appliqué 14 and the tissue adhesive 18 may find their way into high protein meal processed from carcass scraps and renderings. Cotton muslin can be used in appropriate weaves and thickness. The carcasses 20 include, but are not limited to, beef and pork so appliqués of five-by-five inches to five-by-eight inches are preferred for male and female sexes.

Once the pelvic vents have been sealed, the intestines can be removed as a unit without contaminating the remaining carcass 20.

Cotton and muslin materials may not be as flexible as is needed in these applications. During recent dehiding operations, such patch materials were used and were not very flexible. The bond lines between the non-flexible patch and tissue tore, thereby allowing leaks to occur. Dehiding applies strong forces to the hides as they are removed from the animal, e.g., as occurs during the banana-peeling action of hydraulic rams. Cotton laminations with plasticized polyvinylchloride (PVC), or vinyl, and various types of latex rubber appear to be suitable patch materials. Patches made of the animal's own hide may also be used.

The patch materials are best adhered to the tissues in the bung area after hair removal. Some butchering processes remove the hide from the bung area prior to dehiding the animal to make removal of the hide easier. Tests made with animals using this process and bonding the patch to the bung area were very effective. No leaks occurred. In other tests where the hide was not removed from the bung area prior to dehiding, patch integrity was compromised.

Alternatively, a liquid glue may be sprayed directly onto the animal carcass or onto a patch that is then applied to the carcass in order to seal the bung area.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A patch for sealing the natural pelvic vents of animal carcasses to prevent contamination of the carcasses with urine and fecal matter during later processing, comprising:

a rectangular strip of material having dimensions for application to the vents of corresponding male and female sexes of animal carcasses;

a tissue adhesive that cures in seconds and forms strong bonds to skin tissue applied to one side of the rectangular strip and providing for the sealing of the natural pelvic vents of the animal carcasses during slaughter processing wherein intestinal fecal matter and urine is prevented from leaking and contaminating said carcass.

2. The patch of claim 1, wherein:

the rectangular strip comprises cotton muslin and is in the range of five-by-five inches to five-by-eight inches.

3. The patch of claim 1, wherein:

the tissue adhesive comprises an aromatic diisocyanate.

4. The patch of claim 1, wherein:

the tissue adhesive comprises cyanoacrylate.

5. A system for sealing the natural pelvic vents of animal carcasses to prevent contamination of the carcasses with fecal matter during later processing, comprising:

a dispensing stack of rectangular strips of material; having dimensions for application to the vents of corresponding male and female sexes of animal carcasses;

a tissue adhesive that cures in seconds and forms strong bonds to skin tissue; and means for spreading said tissue adhesive to one side of the rectangular strips to provide for the sealing of the natural pelvic vents of the animal carcasses during slaughter processing wherein intestinal fecal matter is prevented from leaking and contaminating said carcass.

6. The system of claim 5, further comprising:

animal carcasses including at least one of beef and pork and having natural pelvic vents over which said rectangular strips are sealed by said tissue adhesive.

7. The system of claim 5, wherein:

the rectangular strips comprise material and is in the range of five-by-five inches to five-by-eight inches.

8. The system of claim 5, wherein:

the tissue adhesive comprises an aromatic diisocyanate.

9. The system of claim 5, wherein:

the tissue adhesive comprises cyanoacrylate.

* * * * *